US007949616B2

(12) United States Patent
Levy et al.

(10) Patent No.: US 7,949,616 B2
(45) Date of Patent: May 24, 2011

(54) TELEPRESENCE BY HUMAN-ASSISTED REMOTE CONTROLLED DEVICES AND ROBOTS

(76) Inventors: George Samuel Levy, San Diego, CA (US); Penny Angel-Levy, San Diego, CA (US); Elizabeth Joyce Levy, San Diego, CA (US); Sarah Anne Levy, San Diego, CA (US); James Alexander Levy, San Diego, CA (US)

( * ) Notice: Subject to any disclaimer, the term of this patent is extended or adjusted under 35 U.S.C. 154(b) by 1014 days.

(21) Appl. No.: 11/138,230

(22) Filed: May 25, 2005

(65) Prior Publication Data

US 2005/0267826 A1  Dec. 1, 2005

Related U.S. Application Data

(60) Provisional application No. 60/576,225, filed on Jun. 1, 2004.

(51) Int. Cl.
*G06F 17/00* (2006.01)
*G06F 17/20* (2006.01)
(52) U.S. Cl. .......................................................... 706/11
(58) Field of Classification Search .................. 706/47
See application file for complete search history.

(56) References Cited

U.S. PATENT DOCUMENTS

| | | | |
|---|---|---|---|
| 4,400,725 A | 8/1983 | Tanigaki | |
| 4,928,301 A | 5/1990 | Smoot | |
| 5,159,445 A | 10/1992 | Gitlin | |
| 5,359,362 A | 10/1994 | Lewis | |
| 5,406,323 A | 4/1995 | Tanigaki | |
| 5,438,357 A | 8/1995 | McNelley | |
| 5,619,254 A | 4/1997 | McNelley | |
| 5,666,155 A | 9/1997 | Mersereau | |
| 5,675,376 A | 10/1997 | Andersson | |
| 5,703,436 A | 12/1997 | Forrest | |
| 5,777,665 A | 7/1998 | McNelley | |
| 5,835,896 A * | 11/1998 | Fisher et al. | 705/37 |
| 5,856,842 A | 1/1999 | Tedesco | |
| 6,264,805 B1 | 7/2001 | Forrest | |
| 6,292,713 B1 | 9/2001 | Jouppi | |
| 6,317,039 B1 * | 11/2001 | Thomason | 340/505 |
| 6,420,031 B1 | 7/2002 | Parthasarathy | |
| 6,440,018 B2 * | 8/2002 | Lekavich | 473/588 |
| 6,449,601 B1 * | 9/2002 | Friedland et al. | 705/37 |

(Continued)

OTHER PUBLICATIONS

Jouppi et al. "First steps towards mutually-immersive mobile telepresence", Proc. 2002 ACM conference on Computer supported cooperative work table of contents, pp. 354-363.*

(Continued)

*Primary Examiner* — Jeffrey A Gaffin
*Assistant Examiner* — Li-Wu Chang

(57) ABSTRACT

A telepresence system comprising a workstation which allows a user to specify a venue located at a remote site. The workstation accepts control information from, and conveys sensory information to, the user. The telepresence system also comprises several remotely controlled systems at remote locations, which carry sensors collecting sensory information from their environment. Each remotely controlled system also requires human assistance to operate according to control information sent by the user. The telepresence system also comprises a means for allocating one of the remotely controlled systems to the specified venue. The telepresence system also comprises a means for allocating a human assistant to assist the allocated remote system. The telepresence system also comprises a bi-directional communication channel which links the workstation to the allocated remote system and transmits control information from the workstation to the allocated remote system and sensory information from the allocated remote system to the workstation.

49 Claims, 12 Drawing Sheets

U.S. PATENT DOCUMENTS

| | | | |
|---|---|---|---|
| 6,454,414 B1 | 9/2002 | Ting | |
| 6,460,018 B1 * | 10/2002 | Kasai et al. | 705/8 |
| 6,469,437 B1 | 10/2002 | Parthasarathy | |
| 6,587,046 B2 | 7/2003 | Joao | |
| 6,596,134 B2 | 7/2003 | Forrest | |
| 6,675,386 B1 | 1/2004 | Hendricks et al. | |
| 7,542,920 B1 * | 6/2009 | Lin-Hendel | 705/26 |
| 2001/0038412 A1 | 11/2001 | McNelley | |
| 2002/0041325 A1 | 4/2002 | Maggioni | |
| 2002/0057279 A1 | 5/2002 | Jouppi | |
| 2002/0113861 A1 | 8/2002 | Lim | |
| 2002/0149677 A1 | 10/2002 | Wright | |
| 2003/0046108 A1 | 3/2003 | Labadie | |
| 2003/0058334 A1 | 3/2003 | Boyden | |
| 2003/0058363 A1 | 3/2003 | Boyden | |
| 2003/0112325 A1 | 6/2003 | Boyden | |
| 2003/0151658 A1 | 8/2003 | Smith | |
| 2003/0163339 A1 | 8/2003 | Elliot | |
| 2005/0024480 A1 * | 2/2005 | Yamazaki | 347/243 |
| 2005/0024488 A1 * | 2/2005 | Borg | 348/36 |
| 2005/0278446 A1 * | 12/2005 | Bryant | 709/227 |
| 2009/0276362 A1 * | 11/2009 | Guerra | 705/80 |

OTHER PUBLICATIONS

Ribbers et al. "Creating Alternative Electronic Trading Mechanisms in Time-Sensitive Transaction Markets", Law and Electronic Commerce, 2002, http://center.kub.nl/staff/kleijnen/emarket.pdf, 1-39.*

On the Trail of the Paparazzi (http://abcnews.go.com/2020/story?id=124366&page=1&page=1).*

N.P Jouppi; S Iyer; W. Mack; S. Thomas; A. Slayden, Proceedings of ACM Multimedia 2004, New York, 2004.

N.P Jouppi; S Iyer; W. Mack; S. Thomas; A. Slayden, Proceedings of IEEE ICRA 2004, New Orleans, Apr. 2004.

N.P Jouppi; First Steps towards Mutually-immersive Mobile Telepresence, Proceedings of the ACM's Computer Supported Cooperative Work, New Orleans, Louisiana, Nov. 2002.

N.P Jouppi; Mutually-immersive Audio Telepresence, in the Proceedings of the 113th Audio Engineering Society Convention, Los Angeles, California, Oct. 2002.

* cited by examiner

TELEPRESENCE BY HUMAN-ASSISTED REMOTE CONTROLLED DEVICES AND ROBOTS

This invention claims the benefit of U.S. Provisional Application No. 60/576,225 with the same title, "Telepresence by Human-Assisted Remote-Controlled Devices and Robots" filed on Jun. 1, 2004 and which is hereby incorporated by reference. Applicant claims priority pursuant to 35 U.S.C. Par 119(e)(i). This invention relates to telepresence, teleimmersion and remote controlled robots. More specifically it relates to methods and systems allowing any user in a network to remotely operate a device located at a remote location on the network, in situations in which these devices have technological and/or legal limitations in their operation and require the assistance of one or more humans at the remote location.

FIELD OF THE INVENTION

Background

A telepresence system, in its widest sense, allows a user to experience being in a remote environment by perceiving sensory information transmitted to him through a communication channel, by a remotely controlled device. It also allows the user to act on this remote environment by transmitting to this remotely controlled device data that allows the device to operate according to his wish. Such devices provide different degrees of realism depending on the technology used. They range from the simple telephone to remotely controlled robots that allow the user to feel totally immersed in the remote environment. These robots accept from their user complex commands that allow them to move and act in two or three dimensions, and transmit back to the user sensory data such as video, audio and tactile information. Between these two extremes there are a multitude of devices such as:
1) Wireless phones
2) Videophones
3) Wireless videophones
4) Videophone on remotely controlled swivel that can be oriented by the remote user
5) Remotely controlled robots equipped with cameras and driven by the remote user
6) Remotely controlled robots equipped with cameras as well as carrying a display of user's face, which allows the user to have a realistic. "face-to-face" interaction with remotely located humans.

As one versed in the art appreciates, a multitude of variations exist that include a variety of sensors such as cameras, microphones, tactile sensors, force sensors, etc; actuator means such as speakers, robotic arms etc; communication channels such as telephone lines, radio links, the internet etc), and displays (such as CRTs, LCDs, LEDs, ELDs, Plasma displays, etc, and with varying degrees of resolution such as regular TV or high definition TV, and sometimes capable of stereoscopic, autostereoscopic and 3D.)

In very simple telepresence devices such as the telephone, only sensory data (audio) flows through the communication link between the users; no data capable of commanding motion is present. These devices are typically stationary. They can be mobile as is the case for cell or remote phones, only if the human holding the device moves at the remote location. The movement of the device at the remote location does not present any liability to the user at the proximal location since he cannot affect the movement of this device. In addition the device at the remote location is not nominally at risk since it is under the control of a human.

In more complex telepresence systems the user is allowed to control the mobility and operation of the remote device. In those cases, he exposes himself to liability since the movement of the device can present risks to itself and to its surroundings. This liability stems in part because, given the current state of technology, these devices cannot provide the user with a perfect experience of the remote environment: the sensory information provided to the user is of a quality lower than what he would have received if he was, in person, at the remote location. Sensory shortcomings may originate from factors such as the narrow field of view of the robot's optics; the partial or complete lack of tactile information including pressure, temperature and muscular feedback; the partial or complete lack of directionality information carried by the data (such as audio); and the lack of sense of balance.

In addition, the control that the user exercises on the remote device may also be limited by such factors as bandwidth and latency in the communication channel and by inertia, delay and other electrical and mechanical limitations of the robotic actuators. In addition, latency between an orientation command activated by a head motion of the user and the corresponding change in the display can make the user nauseous if it exceeds approximately 30 milliseconds.

If the user decides, for example, to control the device to cross a busy thoroughfare, he'll put the device at risk and may endanger other people and vehicles on the road because his ability to detect and evade incoming cars and to control the movement of the device is restricted as explained above. Similarly, for a user to drive a car through such a device is currently out of the question.

Thus a telepresence device operated by a user without the help of a remotely located human assistant, in any environment ranging from a crowded urban environment to an unsafe country area may entail increased risk of damage to the device and to surrounding property. Such unassisted operation may also increase the possibility of injury to nearby humans.

In addition, a remotely controlled mobile robot may be incapable of performing repair and maintenance on itself should something go wrong with its mechanism or electronics.

Admittedly, given enough funding and research, it may be possible, in the future, to build a remotely controlled device that solves all these problems. However, given the limited funding that a user can provide, and given the current state of technology, such devices will be limited in their operation in the present and foreseeable future.

Because these remote devices do not embody all the capabilities of a human, they are at risk of damage to themselves, and can endanger the humans and objects in the environment in which they operate, and thereby present a liability to their owners or users. It is therefore clear that given the current state of the technology such remotely controlled devices will require human assistance at the remote location for technological as well as legal reasons.

If human assistants are to be allocated to remote devices in a commercial environment involving a plurality of users as well as a plurality of remote devices and human assistants, then there is also the need for a method of allocating users, devices and human assistants. In particular, there is a need for providing a potential user with a list of telepresence venues from which he can choose.

It is therefore an object of this invention to provide a method of operation of a remote device that can reduce the risk of damage to property and injury to human. It is also an object of this invention to provide a method of operation of a remote device in which a human is present at the remote location to assist the remote device. It is another object of this invention to provide a method of allocating, interconnecting and assigning users, remote devices and human assistants.

Further features, aspects, and advantages of the present invention will be more fully understood when considered with respect to the following detailed description, claims and accompanying drawings.

SUMMARY OF THE INVENTION

This invention describes a telepresence system which allows a user located at a proximal location to select a venue located at a remote site and operate a remotely-controlled system with the help of a human assistant located at the remote site. The remotely controlled system comprises an interface for conveying control information sent by the user to the human assistant. The remotely-controlled system is selected or specified from a multiplicity of remotely-controlled systems located at different venues.

The telepresence system also comprises a means for allocating from this multiplicity of remotely controlled systems, one particular remotely controlled system according to the venue specified by the user. The telepresence system also comprises a means for allocating from a pool of persons at least one human assistant located at the remote site whose task is to assist the allocated remote system in its operation.

The telepresence system also comprises a bi-directional communication channel linking the workstation to the allocated remote system. This channel transmits control information from the workstation to the allocated remote system, and sensory information back from the allocated remote system to the workstation for conveyance to the user.

The invention allows for varying degrees of cooperation between the user and the human assistant. In its simplest form, the user holds a first video cell phone and observes through it the environment captured by a second video cell phone or a camera held by the human assistant. The user can control the position and orientation of the second video cell phone or camera by sending voice instructions to the human assistant through the cell phone. More complex implementations involve more elaborate telepresence workstations such as a computer, various communication channels such as the Internet, various sensors built-in the remote device such as video and audio, varying degrees of help by the human assistant, various vehicles and support for carrying the remote device, and a business method for allocating users to devices and to human assistants and organizing the transaction between a telepresence equipment provider, a user and a human assistant. The user of the telepresence service is an end-user of the telepresence service.

DETAILED DESCRIPTION

Figure 1:
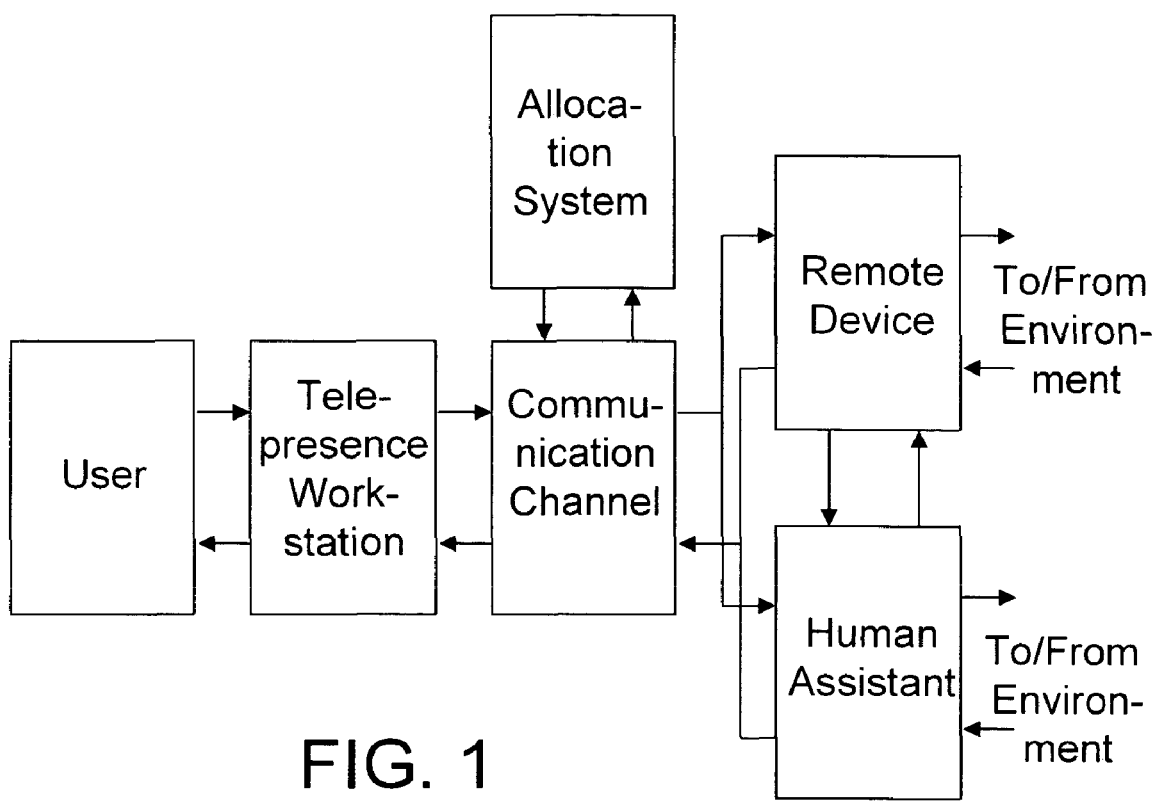
FIG. 1 illustrates in block diagram form the basic operation of the invention and includes the telepresence workstation, the communication channel, the remote device, the human assistant and the allocation system.

The basic description of this invention is shown in FIG. 1. It includes the following components:
  a) a telepresence workstation located at the user's location, allowing the user to specify the venue characteristics such as type and location of the telepresence experience that he desires. This workstation has an interface used during telepresence operation for accepting control information from the user and also for conveying sensory information to the user.
  b) a pool of remotely controlled systems located at one or more locations remote from the user. These remotely controlled systems comprise at least one sensor for collecting sensory information from their environment and require human assistance to operate. In addition they have an interface for conveying a part or the whole of the control information to the human assistant.
  c) a means for allocating from the pool of remotely controlled systems, a particular remotely controlled system to the telepresence venue specified by the user. This selected remotely controlled system shall henceforth be called allocated remote system.
  d) a means for allocating from a pool comprising at least one person, at least one human assistant located at said remote site whose task is to assist said allocated remote system in its operation;
  e) a bi-directional communication channel linking the workstation to the allocated remote system. This communication channel transmits the control information from the workstation to the allocated remote system. It also transmits the sensory information back from the allocated remote system to the workstation for conveyance to the user.

Each of the above modules can be implemented in a multitude of ways. The human assistant and the means for performing the business transaction may be optional.

Telepresence Workstation

The telepresence workstation which allows the user to conduct telepresence operations, provides the user with the capability of selecting a telepresence venue. The venue is characterized by information such as location, desired type of hardware, duration of service etc. These issues will be discussed below.

The telepresence station collects telepresence control information by and data entry devices such as a keyboard, a mouse, a camera, a joystick, a lever, a touch pad, a light pen, a touch sensitive screen, a cursor ball, a scroll wheel, a sensory glove, an eye tracking device, a head tracking device, a pedal, an electroencephalogram machine, a skin conductivity sensor, and a microphone, for generating said control information. For the purpose of this invention, one must note that the term "control information" is applied to any information that is communicated from the telepresence workstation to the allocated remote system. For example, video image of the user is considered control information.

The telepresence workstation collects control information generated by the user and conveys sensory information to the user. The control information may comprise audio data destined for the human assistant and/or machine readable data for the remotely controlled system. A camera at the telepresence workstation permits images of the user to be captured and transmitted as part of the control information to the remote location to be displayed by the allocated remote system. This function allows the image of the user, for example, of his face, to be displayed at the remote location to enable face-to-face contact with humans at the remote location.

Sensory information collected at the remote location are communicated back to the telepresence workstation and conveyed to the user by implements such as a display, a speaker, a touch device and a smell generating device.

Sensory information can be edited before it is presented to the user to convey to him additional information. For example written text such as transcripted voice data can be added to the display. Translated voice data can be dubbed into the audio. The audio data can be augmented with music or dubbed with a voice translation from the remote location. Translation would be of interest to the user if he does not understand the language spoken at the remote location. Video data can be augmented with a textual transcription of voice data (for example for the hard of hearing) or even with a translated transcription of the voice data. Audio and/or video data can be augmented with touristic information, navigation information, weather data, running rental cost and labor cost for said human assistant.

Similarly, control information can be edited. For example, voice data generated by the user and meant to direct the activities of the human assistant, can be transcribed and/or translated before this information is conveyed to the human assistant. Translation would be of particular interest if the user and human assistant do not speak the same language.

The telepresence system can range from a simple cell phone capable of video streaming to a complex teleimmersion system equipped with sensory gloves and a head-mounted high definition television (HDTV) or three-dimensional display. The reader is referred to the vast scientific and technical literature describing telecommunication terminals, and more specifically telephones, cell phones, video cell phones with video streaming capability, displays, cameras, display/camera combinations that allow eye to eye contact, manual control devices such as mice, joysticks, levers, and the like, tactile devices such as sensory gloves, as well as smell and taste conveyance devices. Of particular interest for the embodiment of a telepresence workstation are several technologies that allow eye to eye contact between participants in teleconferencing. Some of these technologies are described in U.S. Pat. No. 5,675,376 by Andersson, U.S. Pat. No. 5,438,357 by McNelley, U.S. Pat. No. 5,359,362 by Lewis et al, U.S. Patent Application 2003/0151658 by Smith, U.S. Pat. No. 5,619,254 by McNelley, U.S. Pat. No. 5,777, 665 by McNelley et al, U.S. Patent Application 2001/0038412A1 by McNelley et al, U.S. Pat. No. 4,928,301 by Smoot, U.S. Pat. No. 5,666,155 by Mersereau, U.S. Pat. No. 5,856,842 by Tedesco, U.S. Patent Application 2003/0112325A1 by Boyden et al., U.S. Patent Application 2003/0058334 by Boyden et al., U.S. Patent Application 2002/0041325 A1 by Maggioni., U.S. Patent Application 2003/0058363A1 by Boyden et al., U.S. Pat. No. 4,400,725 by Tanigaki, U.S. Pat. No. 5,406,323 by Tanigaki et al, U.S. Pat. No. 5,159,445 by Gitlin and al, U.S. Pat. No. 6,454,414 by Ting, U.S. Pat. No. 6,596,134 by Forrest et al, U.S. Pat. No. 6,469,437 by Parthasarathy, et. al., U.S. Pat. No. 6,420,031 by Parthasarathy, et. al., U.S. Pat. No. 6,264,805 by Forrest et al., and U.S. Pat. No. 5,703,436 by Forrest et al. All the above patents are hereby incorporated by reference.

Telepresence workstations can range in shape, size and portability and include cell phones, palmtops, laptops, desktops. They can be designed for the healthy as well as for the disabled. For example, to accommodate the old and the invalid they may include a wheelchair and/or any device designed to facilitate their use by the sensory impaired or physically disabled There may be more than one telepresence workstation all connected to a network such as the Internet and each linked to a different remote controlled unit in a multi-user environment.

Remotely Controlled Systems

The remotely controlled systems are located at remote geographic locations from the telepresence workstation. These remote locations can be anywhere the communication network can reach. The remotely controlled systems comprise one or several sensors and possibly, as well, as actuators and displays. In addition, because of technical and/or legal limitations, these remotely controlled systems require human assistance to operate.

Sensors, can be represented in one of the simplest embodiments such as in a cell phone, by just a microphone capable of collecting audio data; a more complex embodiment would include a camera such as in a video cell phone capable of producing video streams; a more complex embodiment yet, can be embodied by a remotely controlled robot equipped with a full array of sensors duplicating human's senses. Information collected by the sensors is packed and communicated to the user via the communication network and the telepresence workstation.

Actuators in one of the simplest embodiments can be represented by at least one audio or video means for converting part of, or all, said control information in a form suitable to be understood by humans (i.e., voice or images) For example a speaker can produce voice command and a display can generate graphic commands, to be executed by a human assistant. Commands communicated by audio or video means would be essential to the control of the human assistant.

In a more complex embodiment, the actuators can be represented by a remotely controlled swivel on top of which a camera would be mounted. The swivel can have one or two degrees of freedom. Such a device would rely on the user to control the orientation of the camera with respect its carrier, and on the human assistant for translational movements as well as orientation of the carrier.

In a more complex embodiment yet, the remote device would be capable of full locomotion and orientation under remote control by the user. As is well known to one versed in the art, there is a multitude of means for locomotion on land, water and air that can be used in this invention. In particular, a four wheel vehicle can provide good stability for a land vehicle. However, an interesting embodiment would include for the purpose of locomotion, a type of vehicle similar to that with the trademark "SEGWAY" as described in Kamen's U.S. Pat. No. 6,651,766. This vehicle would be equipped with one or several cameras as well as a display of the user's face and would be remotely controlled by the user under the supervision of the human assistant.

Another means for locomotion for the remote device can be implemented using mechanical legs instead of wheels. Substantial research has been conducted at companies and institutions such as the University of Michigan by Jessy W. Grizzle and Carnegie Mellon University on legged locomotion, more particularly, bipedal locomotion wherein the robot is maintained upright by a feedback system that operates approximately like a biological cerebellum. It uses a sensor such as a gyroscope to detect the deviation of the robot from the vertical and applies that information to move the legs in a direction such as to correct for this deviation.

An interface (in the form of a graphical user interface for example) can be placed on the remotely controlled system to convey to the human assistant telepresence control commands issued by the user. This interface can also be used by the human assistant to send information back to the user. The actual software running this interface can be located either on the remote controlled system, on the telepresence station or on the server that supports the web site on which the user logs on to obtain telepresence services. In addition, displays can be mounted on the remotely located device for a variety of reasons such as showing the face of the user as described in U.S. Pat. No. 6,292,713 titled Robotic telepresence system by Jouppi, et al.

In addition, the remotely controlled system can incorporate audio speakers to convey control information generated by the user to the human assistant.

The remote device can also be endowed with a varying degree of autonomy. In yet another and more complex embodiment, the remote device would be equipped with artificial intelligence capability whereby it can achieve semi-autonomy from said user and said human assistant such as to be able to deal with low level control and maneuverability issues such as "Turn Right" or "Set Speed at 5 Miles per Hour," leaving to the user the high level commands such as "Climb to the top of the mountain" or "Go to the San Diego Convention Center."

It should also be noted that the remote device is really a system which does not have to be constructed in a single electronic box. It may consist of several separate components, some of which may be carried by the human assistant and others may be carried in a dolly, cart or alternate convenient motorized or hand-pushed transport. For example, the human assistant can be carrying headphones to listen to the instructions from the user, while pushing the rest of the remote device on a dolly. The headphones may be wirelessly connected, or have a wire connection, to a receiver on board the dolly. Or the headphone may be wirelessly connected, or have a wired connection, to a cell phone attached to the belt of the human assistant. Thus the remote device could be in several mechanically independent parts and the human assistant could be carrying any number of these parts.

It should also be noted that the remote device could comprise biological components including animals. For example navigation instructions could be sent by the user to the remote location and used at the remote location to control the animal's movements.

The remote controlled system could be totally dependent on the human assistant for locomotion. More specifically the human assistant may have to physically carry the remote controlled system. Alternatively the remote controlled system may include a wheeled transport. In this case, the task of the human assistant comprises pushing or driving the wheeled transport.

Means for Allocating a Remotely Controlled System.

The allocation of the remotely controlled system could be performed in a centralized fashion or in a decentralized manner. For example, if the telepresence operation is implemented on the Internet, the allocation process can be centrally run by software running on a server used by the web site on which the telepresence business is run and on which the user must log on to obtain telepresence services. Alternatively, the allocation process may be decentralized and subjected to a bidding process as in E-BAY™ where the decisions between sellers and buyers depend on the sellers and buyers themselves. Thus, the allocation of the remotely controlled systems could be made by the owner of these systems and by the prospective users of telepresence services. Yet another method of allocation could be made by human agents arranging telepresence services for their customers. Still another allocation method is to reserve for each remotely controlled system a fixed venue. The telepresence user would then obtain access to these remote systems on a first-come, first-serve basis or some other predetermined priority scheme.

Means for Allocation of Human Assistants

Since the remotely controlled systems have technical and/or legal limitations, they require the help of human assistants. The allocation of human assistants could approximately follow the same process as the ones outlined above for the allocation of remotely controlled systems.

The human assistant tasks are to support the remotely controlled system in its operation, and in particular in making use of control information generated by the user. The human assistant could be selected for any desirable skills or characteristics such as geographical location, foreign language fluency, engineering ability, touristic knowledge of the remote area or simply labor rate. The human assistant could provide his service freely or charge a fee. He could be a total stranger to, or a friend or family member of, the user. He could be an employee of an employment company who the user or the telepresence hardware rental company hires on a temporary or permanent basis. He could provide a language translation service to the user if the user must interact with people in a language unknown to him. If the environment is unfamiliar to the user, the human assistant could serve as a guide.

One important task of the human assistant is to help the remote device in its movement. He can accomplish this task in a number of ways including but not restricted to, carrying the device; pushing a dolly carrying the device; partially or fully controlling a motorized vehicle carrying the device; supervising the operation of a remotely controlled vehicle that carries the device, only intervening in emergencies and unforeseen, risky or otherwise intractable situations; performing maintenance of the device; or he could simply initiate and terminate the operation of the remotely-controlled device. Thus the tasks of the human assistant include:

a) providing translational locomotory services for said remote control device;
b) orienting said remote control device;
c) providing engineering services for said remote control device:
d) maintaining said remote control device;
e) providing touristic guide services to said user;
f) providing real estate guidance to said user;
g) providing a translation service to said user;
h) steering for said remote controlled device;
i) operating sensor of said remote controlled device;

j) providing billing services for rental of said remote controlled device by said user The human assistant may also carry at the remote location a live display of the user to enable the user to experience being face-to-face with people at the remote location. Eye to eye contact can be achieved between the user and people at the remote location by equipping the display with two cameras on either side. The two cameras generate independent video streams which when combined can produce a point of view located in the center of the display, thus allowing the user to experience eye to eye contact with people at the remote location. This topic shall be discussed in greater detail below.

Additionally, the human assistant could shield his own face by means of a mask, a hood or burkha to emphasize the virtual presence of the user at the remote location.

As the remote device becomes more and more autonomous, the role of the human assistant becomes more and more supervisory. For simple remote devices incapable of locomotion, the human assistant is relied upon for the movements of the device, such as translation, orientation and elevation. Slightly more complex remote devices may be equipped with a remote controlled swivel to give the user control over orientation and possibly elevation leaving the remote assistant with the task of carrying the remote device and to provide it with translational movement according to the instructions he receives from the user. For yet more complex devices the responsibility of the remote assistant is restricted to tasks such as checking for hazards and unlawful user's behavior, dealing with the unexpected, providing in-the-field maintenance, and guarding against theft of the remote device.

Communication Channel

The communication channel could be implemented in a multitude of ways as is well known to those versed in the art. It may be preferable for the remote station and/or human assistant to be connected wirelessly, to allow the device to be unencumbered with wires. However, the user at his workstation is not necessarily dependent on wireless technology. He can use any communication channel to which his workstation is configured provided that the appropriate conversion is eventually performed along the communication line between the format at the workstation and the format at the remote device. Thus the communication channel could also be a chain of communication steps, each step relying on a different technology. These communications links include but are not limited to cellular networks, radio links, a telephone links, a cable links, and the Internet.

One of the simplest embodiments is to establish a telephone link between the user and the remote device and human assistant. The user could use a regular phone or a cell phone while the human assistant and/or remote device would use a wireless phone technology such as cell phones using conventional cellular networks. This phone link would carry voice from the user to instruct the human assistant and/or data to control the device. In return, the user would receive voice information from the human assistant and/or data from the remote device (such as audio or video). Optionally, voice over Internet technology could be used.

Even more interesting is videophone technology, capable of transmitting video streams of the remote environment to the user and transmitting the image of the user's face or body to the remote environment. According to this embodiment, the remote device would comprise a video cell phone; the user's workstation would include video capability such as a video phone, a video cell phone or a computer capable of capturing and displaying streaming video images.

Of particular interest is the use of the newest wide band wireless communication protocols described in the IEEE standard 802.16 called WiMax and the IEEE standard 802.II. These communication systems working together or separately can provide wireless wide band Internet access to the remote device. More advanced and more powerful communication protocols are being developed such as the 802.IIn which may compete with DSL for broadband, yet offer wireless access. Clearly this invention is not tied to any one particular communication method but can benefit from new advances in communication technology. Various combinations and permutations chaining different communication technologies are also clearly possible as is well known in the art.

The use of the internet as a communication medium offers great advantages because of its global reach, its connectivity, and its inherent ability to facilitate the allocation of a plurality of user to a plurality of remote devices and human assistants, for the purpose of business transactions.

Business Transaction Means

The means for conducting a business transaction for a telepresence service could take many forms. For example, in the case where a single user is to be allocated to a single remote device and human assistant, the means for performing the business transaction may be as trivial as a simple oral agreement between the user and the human assistant over a hand-shake or over the telephone. In the case where a plurality of users must be allocated to a plurality of remote devices and human assistants, the allocation may be performed by humans, by computer or by both. The internet, in particular, offers a suitable medium for performing such transactions.

The business transaction process could be very centralized and controlled at a central location such as a car-rental company. For example, the user would phone the telepresence rental company and ask for a telepresence robot at a particular date, time and place. Upon payment, with credit card, for example, the telephone operator would provide the user with the website address and password for a remote device satisfying the user's requirements. The telepresence rental company would also allocate a human assistant for handling the remote device. This human assistant would be selected from a pool of employees at the telepresence rental company or from one or several candidates provided by a separate employment agency.

Figure 2:
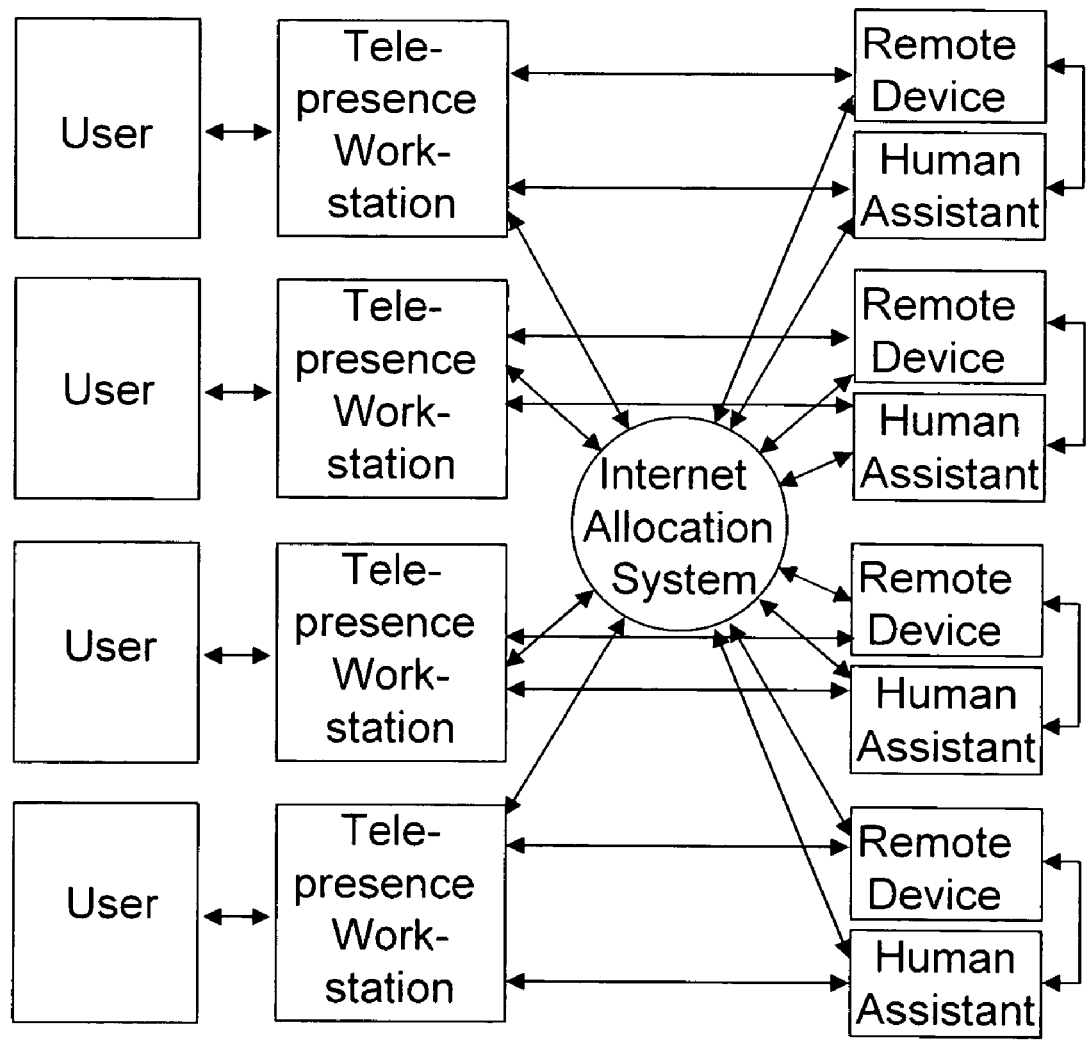
FIG. 2 shows how several users, remote devices and human assistants can be allocated to each other by means of internet connections.

FIG. 2 illustrates a system in which the allocation is centralized and performed, for example, by software running on the server for the web site, but the interaction is direct between the telepresence workstation and the remote device and human assistant. In such a system, the web site software could still, for example, monitor in a supervisory way the extent of the transaction for billing and/or maintenance purposes.

Alternatively, the business could be run as a free market, independently of any centralized organization, using an auction market conducted over an Internet website such as the one trademarked under the name of E-BAY, where users and human assistants would make business arrangements based on their own requirements and prices. Business transactions could involve outright selling at a fixed price or bidding such that several users are competing to procure a service, or in which several human assistants are competing to provide a service. In addition the owners of the remote controlled system could also use such an auction market to rent or lease hardware. Such internet free market scenario would typically require that users and human assistants post on the web their location, availability, time and date, hardware in their possession, requirements (for users) and qualifications (for human assistants) and price. As in E-BAY, the quality of the service provided by the human assistants would be rated by the users and posted on the web to ensure continuing good service. In addition, payment, by credit card, for example, could be performed by a secure transaction and placed in an escrow deposit before the service is rendered to guarantee that payment is made.

Figure 3:
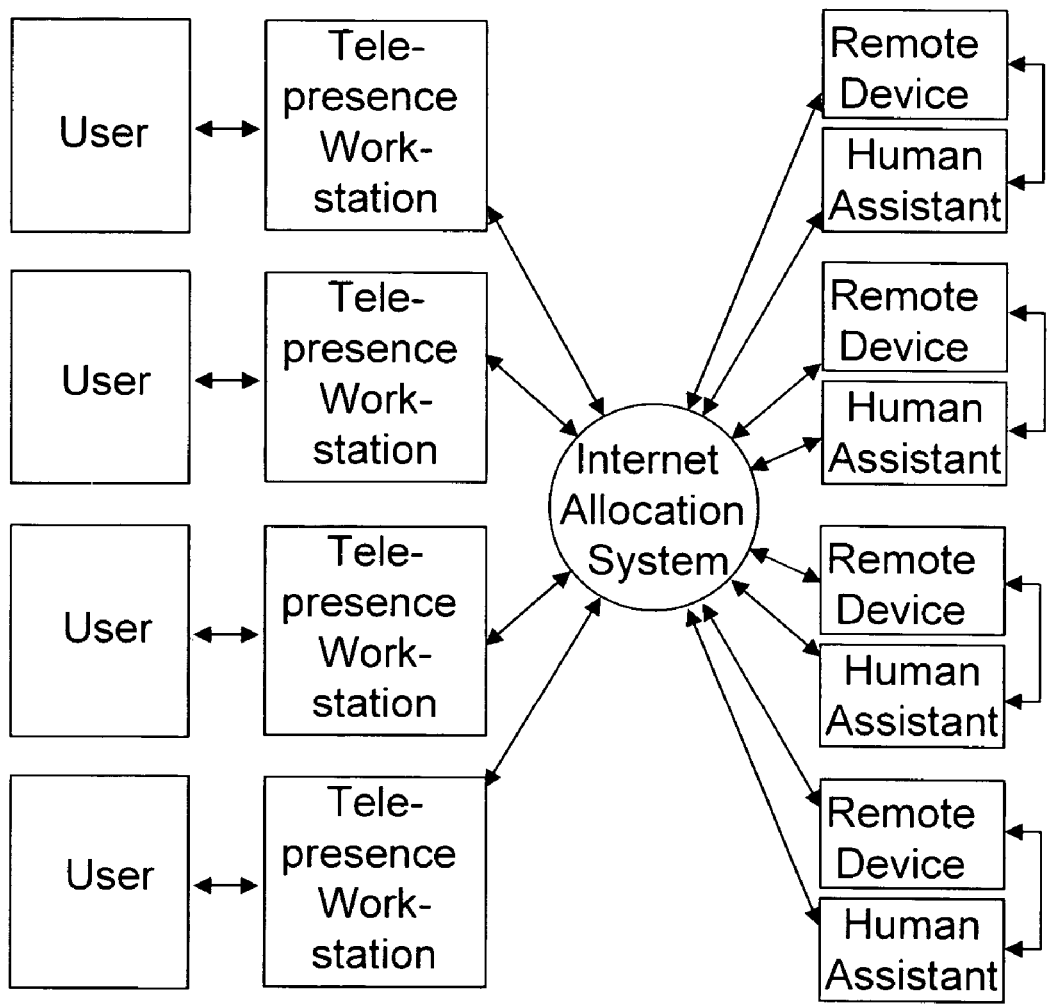
FIG. 3 shows how several users, remote devices and human assistants can be allocated to each other through an intermediary web server on the Internet.
Figure 3A:
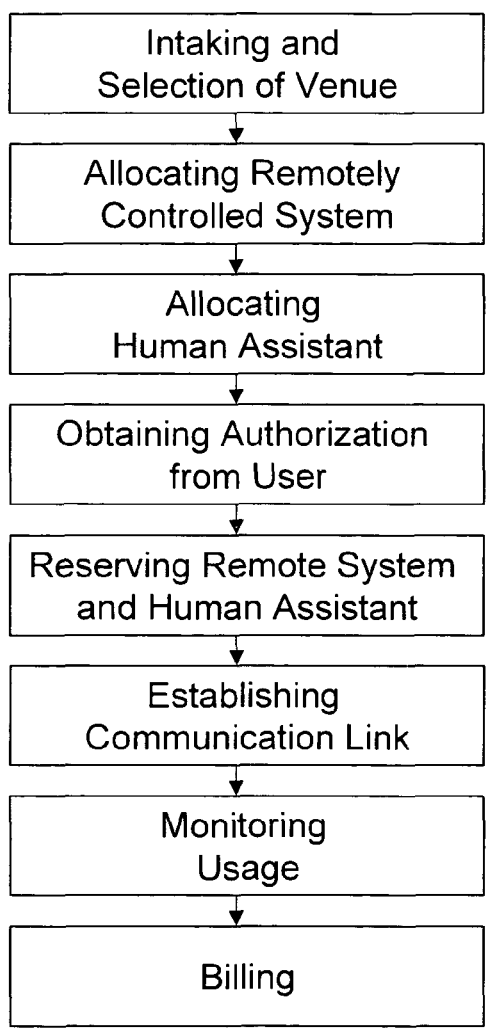
FIG. 3A illustrates the business method starting with the intake of a customer to the billing process.

In general, a business transaction for the use of a telepresence device over the internet requires the following steps also shown in FIG. 3A:

1) Intake and reservation
2) Allocation of the user to the remote device and to the human assistant
3) Authorization
4) Establishing the connection
5) Remote operation
6) Billing Intake and Reservation This intake and reservation process requires querying the user for the following information. The query can be done, in person, over the phone or over the internet. Typically the query may comprise some or all of the following information:

1) The name and/or geographical location which the user is interested in visiting by telepresence. This entry would be required in instances where the remote location is known, such as tourism. The user could define the venue location by typing for example, location coordinates, street names, landmark's names, school's name, hospital's name, convention center names, etc. The user could also be given a choice from a list of available venues. The venues could also be grouped and linked to each other according to any desirable criteria, not necessarily geographical. For example conference locations could be grouped according to technical topics, tourist locations according to language spoken, real estate locations according to price range, shopping expeditions according to the type of objects to be purchased etc. . . . Furthermore, these venues and groups of venues could be linked according to any arbitrary desirable manner, such as in a hierarchical network or even in a network designed to appeal to a particular market.
2) The name of the person that he intends to visit. This entry may be suitable in applications such as visits to persons in an institution such as a home, a university, a hospital, or a nursing home. In some cases, the address of the person to visit may be retrievable from a database accessible by the telepresence company or otherwise available.
3) The type and/or model of telepresence device that the user desires. This entry would be required if there several models of telepresence devices available to clients, with different capabilities and prices.
4) Identification information regarding the human assistant. This entry would be required if the user has any preference regarding the human assistant, such as sex, age, language spoken, religion, race, political affiliation, etc, staying within legal parameters.
5) The language that he desires to use in his communication with the remote human assistant. This entry may be desirable, for example, when the remote location is in a foreign country with a different language.
6) The type of service that he desires from the human assistant.
7) The expected beginning date and time of his rental
8) The expected ending date and time of his rental
9) The hardware and software characteristics of the telepresence station or computer that he intends to use. This entry may be required to match the capability of the remote device to the capability of the user's computer, and to specify the type of service is required from the hardware.
10) The name and address of the user, for billing and/or marketing purposes.
11) The credit card number of the user for billing purposes if billing is done by credit card.
12) The maximum time duration reserved
13) The billing rate
14) Insurance information or statement for damages, injury and theft.

Allocation of Remote Device and Human Assistant.

Based on the pertinent information, the user, remote device and human assistant could be allocated to each other by humans, by the software serving the commercial enterprise or by a combination of both. The following steps are required for allocation:

1) Obtain information from the user about his time availability and his desired remote location.
2) Ascertain that an appropriate remote device is available at the required time and place
3) Contact the human assistant with the appropriate qualifications and ascertain that he will be available at the required remote time and place. More than one human assistant may be allocated, depending on the need of the remote device and on the type of telepresence service desired.

Authorization

When all requirements for the connection are satisfied, the user may be advised that his telepresence transaction request has been granted. Similarly a notice may be sent to the human assistant. Otherwise, the user is told that his request has been rejected, possibly with the reasons for the rejection, such as incomplete or erroneous data entry, insufficient credit, or unavailability of a remote device or human assistant. Optionally, additional transaction details that had been left undefined in the intake process, may be may be defined or made more precise. These may include for example the name of the human assistant and the exact time of the service.

Optionally the user may then be given the opportunity of performing an additional step in authorizing the transaction, such as, if the transaction is over the internet, by clicking on an icon.

Optionally the user may be sent a password to allow him to operate the remote device and/or be recognized by the human assistant.

The authorization procedure could also be performed by means other than over the internet as for example, over the telephone, with a human user or with a voice recognition system.

Reservation of Remote Device and Human Assistant

Once the authorization is obtained from the user, the remote device and human assistant(s) are reserved for the appropriate time and place. Upon receiving the authorization from the client, a notice is sent to the human assistant confirming the transaction.

Establishing a Connection

Once the transaction has been authorized, the telepresence station and the remote device can be connected. This can be done immediately after authorization if all the requirements are satisfied, or at the appointed time. This connection can be implemented in many possible ways.

If the communication is performed by telephone, videophone, cell phone or video cell phone, then the telephone link can be established, for example, by giving to the user the telephone number of the remote device, or of the human assistant; or giving the telephone number of the user to the human assistant; or remotely instructing the remote device to dial the user; or forwarding the call from to the user to the human assistant or to the device or forwarding the call from the human assistant or remote device to the user.

If the communication medium is the internet as shown in FIG. 2, then the software serving the telepresence company's web site can initiate the connection by retrieving the web address of the selected remote device from its database and handing it over to the software running at the telepresence station. Optionally, a pass key or encryption code that can be recognized by the remote device, and used to protect against unauthorized control of the remote device, can also be transmitted to the telepresence station by the web site software. Upon receiving the web address of the remote device, and optionally the pass-key or an encryption code, the telepresence station directly queries the remote device through the web. If the pass-key or encryption scheme is recognized by the remote device, the connection is established.

An alternative method of making the connection between the remote device and the telepresence station is to use the server running the web site as an intermediate communication relay as shown in FIG. 3. According to this scheme, the web site software retrieves from its database the web address of the selected remote device and establishes a bi-directional link with it. This link can utilize a pass-key and/or an encryption scheme to prevent unauthorized control of the remote device. The web site software can then relay information from the telepresence station to the remote device and vice-versa. This scheme may increase latency but allows the web site software to monitor more closely the operation of the remote device. It allows supervisory control of the transaction at the web site.

Optionally a three way link could be established as shown in FIG. 2 between the telepresence station, the remote device and the server running the company web site. This approach would minimize latency in the operation of the remote device while keeping the web site server continuously apprised of the operation of the remote device including some business transaction parameters such as the amount of time used, and maintenance data on the remote device.

Remote Operation

Depending on the type and capability of the remote device, varying degrees of help are required from the human assistant for the user to operate the remote device. In one of its simplest forms, this invention requires both the user and the human assistant to hold a video cell phone. The user can observe on his video cell phone the image captured by the video cell phone held by the human assistant. He can also communicate by voice command how he wants the human assistant to move and orient his video cell phone.

Several alternative designs are possible. For example, the command can be conveyed to the human assistant by means of a display. The remotely controlled device can be held by the human assistant or can be mounted on the shoulder of the human assistant, or on a hand-pushed or motorized vehicle. The range of operation is limited by the communication channel which can use any convenient and available technology such as a cellular network or the Internet or a combination of technologies with the proper conversion hardware and software in between. The human assistant can be selected from a pool for a range of talents and capabilities.

Billing

Billing can be performed in a variety of ways such as through the web site software that handles the telepresence transactions, by a telephone user, and/or by the human assistant.

If the communication medium is the internet, then, at the end of the telepresence session, the server running the web site software performs the billing and possibly schedules maintenance by retrieving the amount of time and/or services used up in the transaction, either from its own database (if it has been kept apprised of the operation as in a three way link configuration for example) and/or from the remote device and/or from the telepresence station. Billing is performed according to a predetermined function of the amount of usage.

Prearranged Venues for Business Transaction Means

One of the simplest methods for allocating user to human assistant and hardware is to prearrange the time and place for the telepresence operation. This information would be useful both for the prospective users as well as for the prospective human assistants. For example, one could announce by means of a notice on the web, that tours of the University of California San Diego campus will be available for prospective students from 9 AM to 12 PM every Wednesday from May to September. Prospective students desiring such tours will login as users, at a web site supporting these tours and prospective human assistants will login at the same web site but under an employment page possibly administered by the University or by a student employment firm. These human assistants may be UCSD students carrying with them their own laptop equipped with a wireless card and a webcam. Such arrangements will make use of the wireless network (for example, using the communication standard 802.11b operating at 11 megabits per second or a later standard) that the university is providing to its students. Of course other communication channels may be used if they are available and other remote devices such as video cell phones could be used or handheld computers (palmtops), if they have video streaming capability.

Variations

In its simplest case this invention describes a telepresence operation involving a single user operating a single remote device assisted by a single human assistant. In this case the allocation problem is trivial.

More complicated cases arise such as in a business environment where a large pool of users, remote devices and human assistants may have to be allocated to each other. The allocation process may involve allocating a single user to a single device assisted by a single human or by several humans. It may also include a single user operating multiple devices assisted by a single human or by several humans. It could also include multiple users participating in the control of a single remote device assisted by a single human or by several humans; or multiple users controlling multiple remote devices assisted by a single human or by multiple humans.

In addition, the telepresence transaction could be initiated by the user as well as by the human assistant. It is conceivable that a human assistant solicits several users to obtain sponsorship to perform a feat, exploration or adventure in an exciting, dangerous, interesting, romantic, sexual, or hardly accessible environment. For example, adventures such as meeting or having a date with a famous movie star, going on a safari or climbing a tall mountain would be the kind of adventures for which funding could be solicited (within legal parameters).

Specific Embodiments

To express the range of this invention, several versions of preferred embodiments are presented below:

1) Wireless videophone held by human

2) Wireless videophone with swivel carried on shoulder by human
3) Wireless videophone with swivel carried on dolly pushed by human
4) Remotely controlled two-wheeled transport supervised by human assistant
5) Remotely drivable robot in which human acts as a backup driver.

As can be appreciated, the above embodiments represent a small sample of all embodiments possible in this invention.

Wireless Videophone Held by Human

Figure 4:
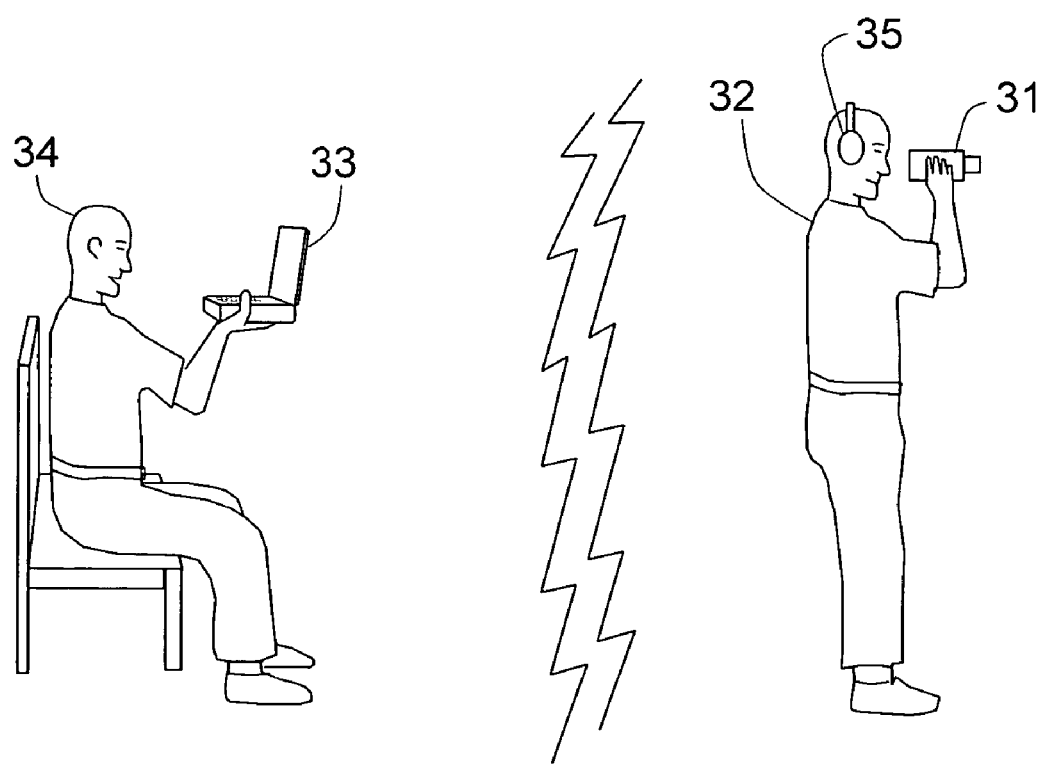
FIG. 4 describes a simple telepresence system wherein video cell phones are used both by the user and by the human assistant.

A simple version of this invention is illustrated in FIG. 4: the remotely controlled device is a simple video cell phone 31 held by a human assistant 32. This video cell phone 31 comprises a camera and is connected to the workstation which could also be a video cell phone 33, by means of a wireless internet connection. The user 34 at the workstation 33 observes the video and audio data generated by the camera and generates voice instructions regarding the orientation, position and movement of the camera. The voice instructions are transmitted back to the human assistant 32 at the remote location by a communication link such as voice over internet or by means of a cellular phone network. The human assistant listens to the instructions by means of earphones 35 for example, and responds to the voice command by moving his video cell phone 31 accordingly. The instructions may include but are not restricted to commands such as turn left, follow Elm street north, go to the Washington Monument, cross the street, enter the art store, purchase the painting, bargain on the price, ask a technical question, explain who you are, go visit my children at the university, walk faster, take a break, stop, etc. . . .

Wireless Videophone with Swivel Carried on Shoulder by Human

Figure 5:
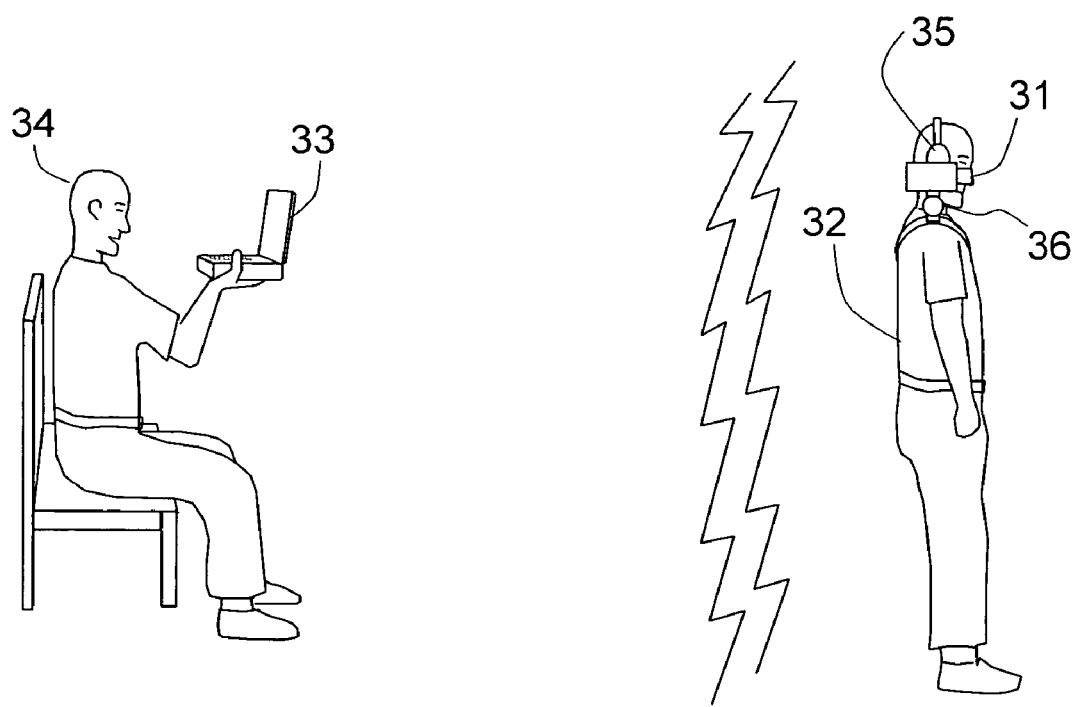
FIG. 5 shows how a remote device mounted on a swivel can be mounted on the shoulder of a human assistant.
Figure 6:
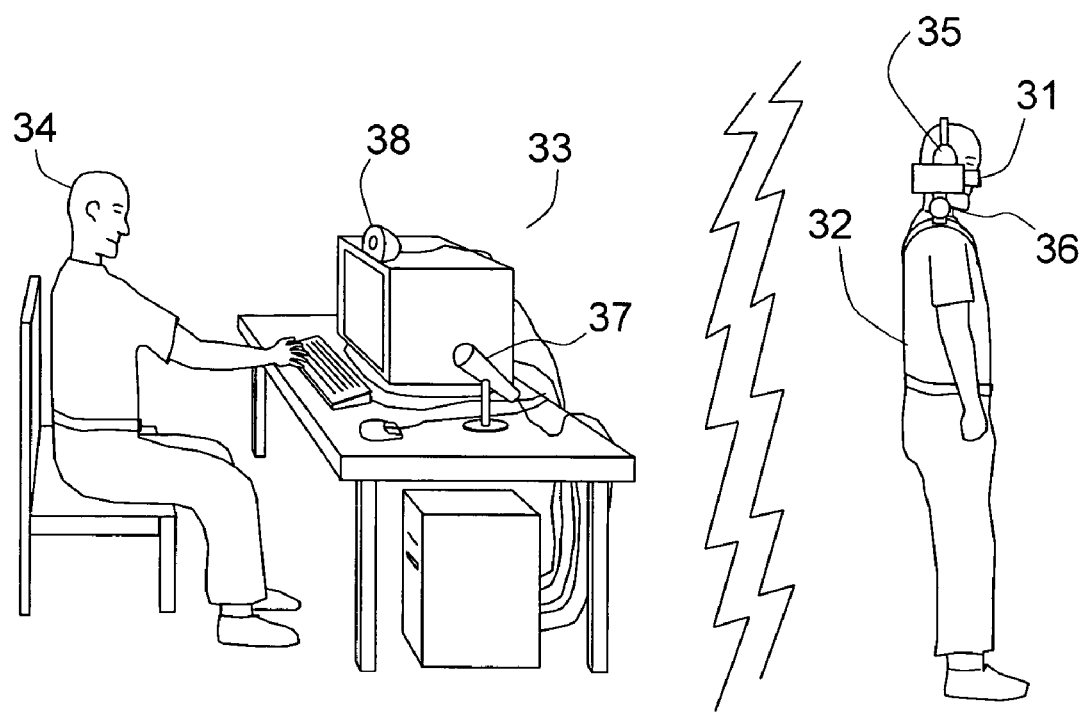
FIG. 6 illustrates how the user could use a computer as a workstation and the human assistant could use a video phone or the like as a remote device.

Another version is shown in FIG. 5: the remotely controlled device comprises a camera mounted on a remotely controlled swivel 36 which could optionally have one or two degrees of freedom. The device, carried by the human assistant 32 on his shoulder, provides the user 34 with a point of view nearly identical to that of the human assistant 32. The user 34 controls the orientation of the swivel 36 but sends audio or visual commands carrying displacement information to the human assistant 32. An approximately similar idea is shown in FIG. 6 wherein the video cell phone at the user location is replaced by a computer with internet access. This computer is capable of accepting voice data by means of a microphone 37, and video information by means of a camera 38.

Wireless Videophone with Swivel Carried on Dolly Pushed by Human

Figure 7:
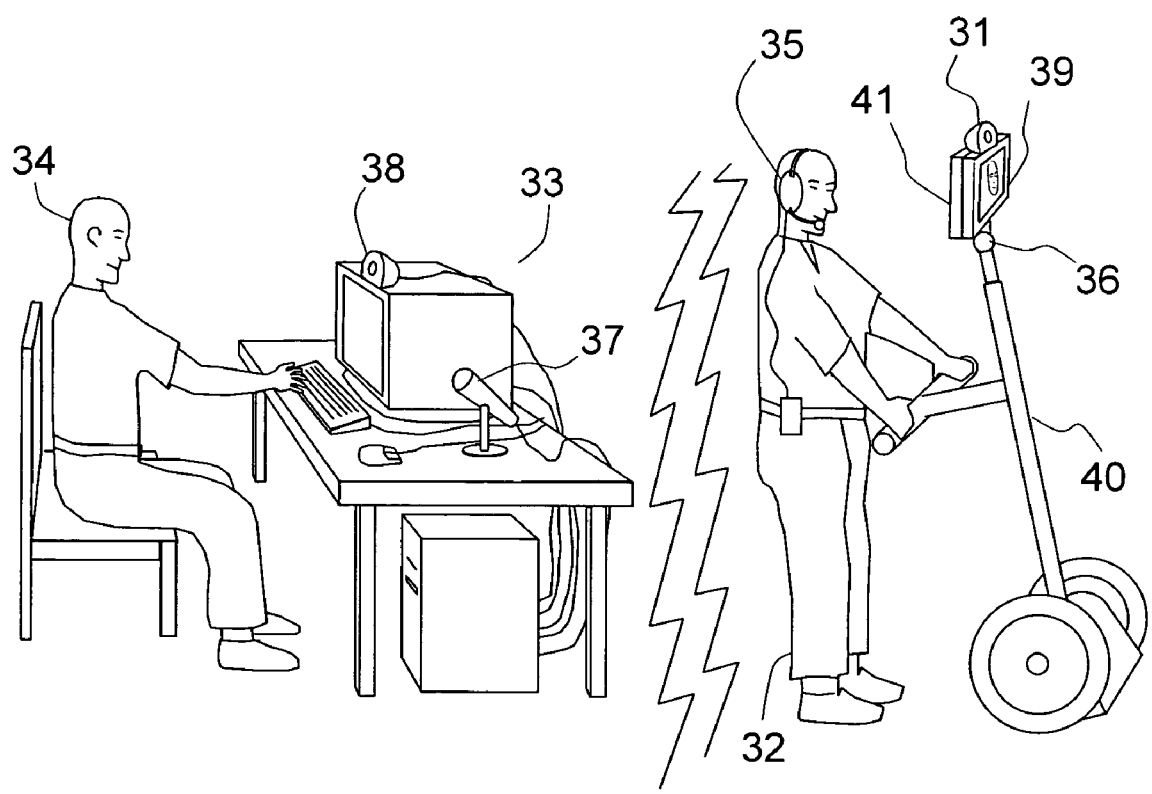
FIG. 7 describes how a remote device can be mounted on a dolly pushed by a human assistant.
Figure 8:
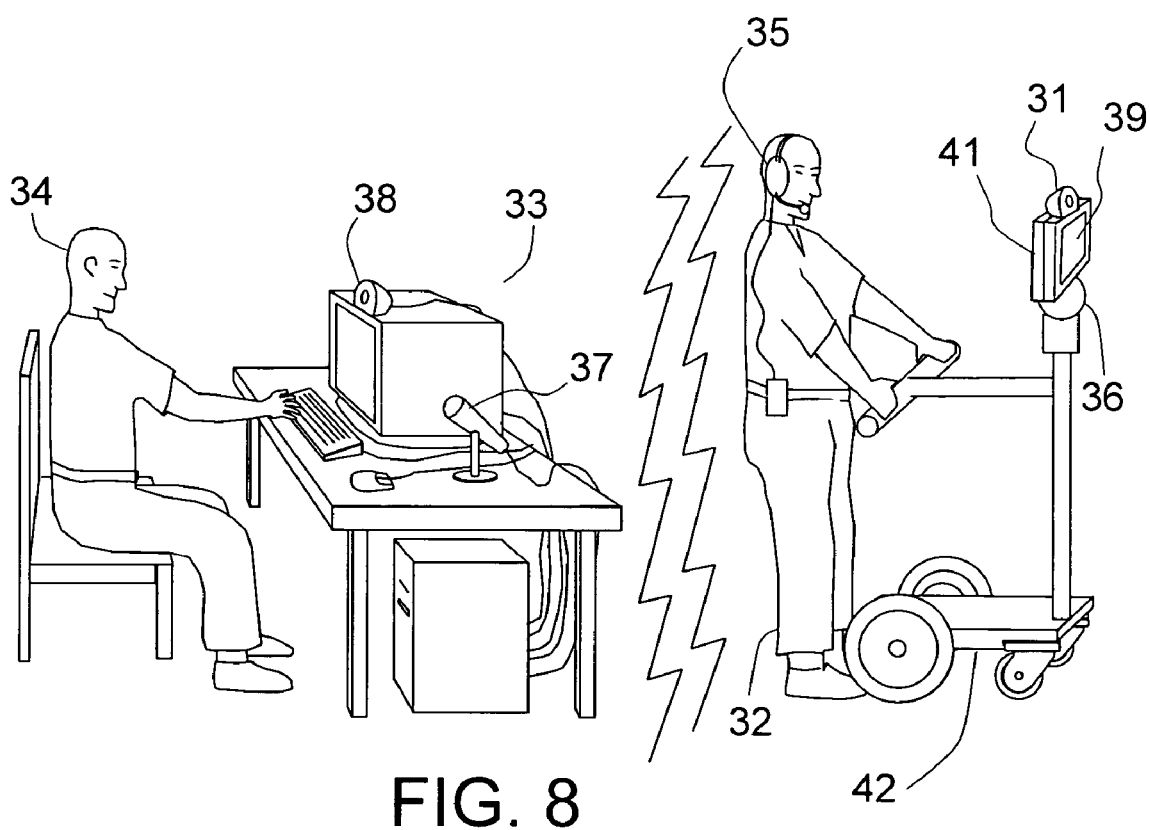
FIG. 8 shows how a remote device can be placed on a hand-pushed four wheel cart.

Yet another version of this invention is illustrated in FIG. 7. The remote controlled device is a camera 31 and display 39 on a remotely controlled one or two-degree of freedom swivel 36. The swivel 36 and camera, display and swivel assembly is mounted on a dolly 40 pushed by a human assistant 32. The video and audio information generated by the camera 31 is transmitted through a wireless internet link to a workstation and conveyed to a user 34. The user 34 observes the video and audio and generates audio (vocal) and digital commands through the workstation. These commands, together with a video of his own face are sent, through the wireless internet link back to the remote location. The audio commands are conveyed to the human assistant 32. The digital commands are used by a motorized actuator to control the orientation of the swivel 36. The video of his face is presented by the display 39. Optionally the vocal command could be replaced by digital commands which are conveyed to the human assistant 32 by means of a second display 41 at the remote location, which may be attached to the back of the first display 39. The commands could be in text form such as "Turn Left" or in graphical form such as an arrow or a pointer on the display. An approximately similar idea is presented in FIG. 8, wherein the two wheeled dolly 40 is replaced by a four-wheel cart 42.

Remotely Controlled Two-Wheeled Transport Supervised by Human

Figure 9:
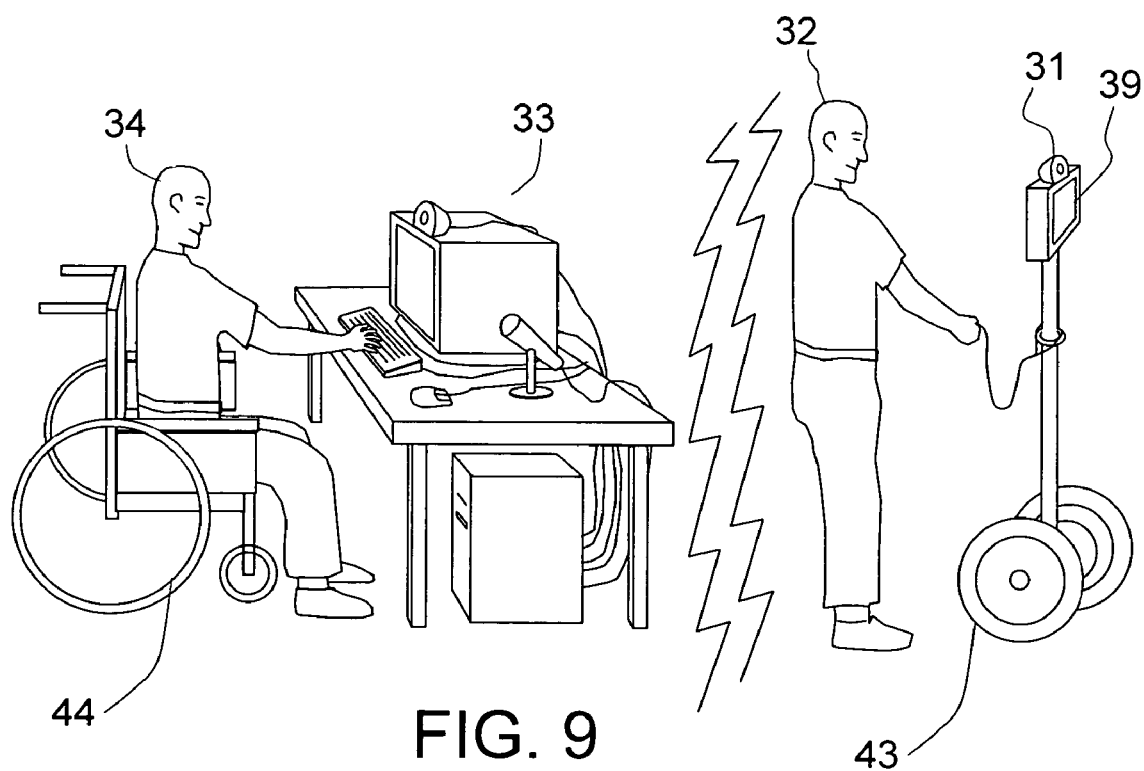
FIG. 9 indicates how a remote device can be mounted on a type of vehicle known under the trademark of SEGWAY. It also shows how the workstation could include a wheel chair.

Another version is illustrated in FIG. 9: the remotely controlled device is a mobile robot comprising a camera 31 and display 39 combination, mounted on a type of personal transport 43 trademarked under the name of "SEGWAY" described in Kamen's U.S. Pat. No. 6,651,766. Video and audio data is sent to a workstation 33 by means of a bi-directional wireless internet connection. The user 34 who may be sitting in a wheelchair 44 behind the workstation, observes the video and audio, and generates through his workstation 33 digital commands which are sent through the wireless internet connection back to the mobile robot 43 for controlling its movements and activities. The human assistant 32 intervenes only when the robot 43 is about to perform a risky or illegal maneuver. This version does not need as much communication with the human assistant as the versions described above. Communication may be necessary at the beginning and at the end of the process to establish the parameters of the interaction between the user 34 and the remote human assistant 32. For example they would have to decide Such things as how long the service would last and the geographical location to be covered.

Remotely Drivable Robot in which a Human Acts as a Backup Driver

Figure 10:
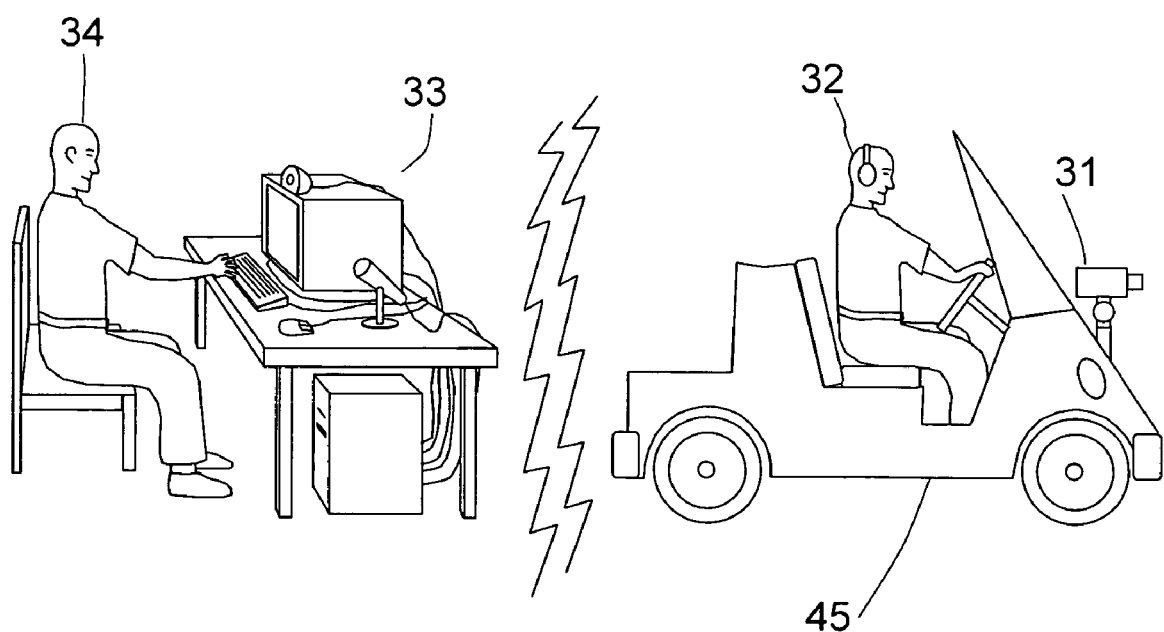
FIG. 10 illustrates how a remote device can be mounted on a four wheel vehicle which can be driven optionally by the user (with human assistant supervision) or by the human assistant.

Yet another embodiment shown in FIG. 10 includes a remote device comprising of a four wheel vehicle 45 equipped with sensors such as a camera 31, as well as a human assistant 32 in the driver's seat. As in the previous embodiment, the sensor suite communicates with the telepresence station 33 by means of a wireless radio link connected to the internet. When driving conditions are safe, the user could drive the vehicle 45 remotely with the human assistant acting in a supervisory role. Alternatively, the human assistant could drive the vehicle according to the commands of the users. Allowing the user to drive the vehicle provides him with a greater sense of control and presence. However, having the human assistant drive the vehicle may be less risky and may be indicated when the user is unfamiliar with the environment or unwilling to perform this task. It is therefore possible to accommodate varying degrees of participation in the task of driving and controlling the location and orientation of the camera, between the human assistant and the user.

Figure 11A:
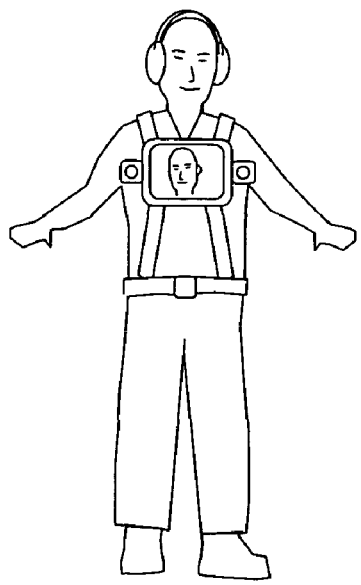
FIG. 11A shows a video image of the user displayed by the human assistant.
Figure 11B:
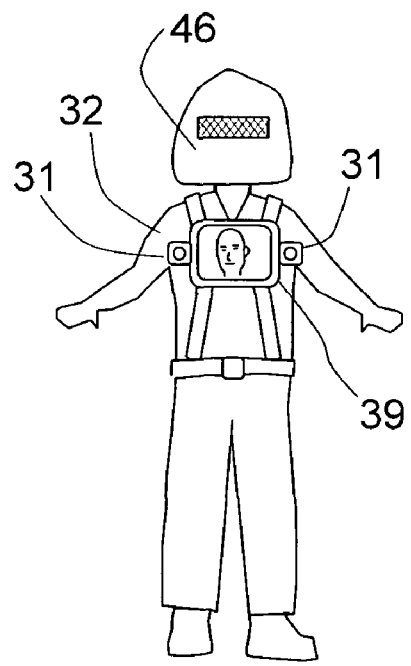
FIG. 11B illustrates how the presence of the user can be emphasized and that of the human assistant de-emphasized, by masking the head of the human assistant.

Another variation shown in FIG. 11A utilizes a human assistant carrying a display 39 of the user on his chest. The human assistant 32 could carry a single camera to provide the user with a view of the remote environment. Alternatively, two cameras 31 could be positioned on either side of the display 39. The video information from the cameras is fused by means of an algorithm run on a processor, to generate a virtual image as seen from an arbitrary position such as a point located between the cameras, in front of the display. An approximately similar approach has been suggested by researchers (A. Criminisi. J. Shotton, A. Blake, P. H. S. Torr) at the Microsoft Research Ltd in Cambridge, UK, for facilitating eye to eye communication between teleconferencing participants. FIG. 11B describes how the presence of the user can be emphasized and that of the human assistant, de-emphasized by covering the head of the human assistant with a chador, burkha or mask to hide his facial expressions.

Clearly the environment, mobility, weight requirement, etc, as well as the application desired of the user affects the type of hardware which should be used in any telepresence application. For example, if the telepresence experience involves climbing a mountain, the best type of remote device may be a simple and light-weight video phone. However, if the experience requires visiting an elder person in a nursing home, a display showing the face of the user may be more suitable. If the experience requires direct acting on the environment, then a remotely controlled robot may be used. Applications of this invention include but are not limited to:
1) Tourism
2) Attending conferences, training or classes and other instructional or educational activities
3) Touring universities by prospective students
4) Visiting family members and friends in nursing homes, hospitals and other environments
5) Participating in family events and other festivities
6) Performing business transactions at a remote location
7) Visiting real estates locations by prospective buyers and renters
8) Providing an alternative to sending flowers and/or balloons to someone
9) Providing means for disabled and/or elderly persons for attending functions, visit locations and people, and shopping
10) Participating in field trips or expeditions involving scientific, technical or artistic research such as, but not limited to, archeology, architecture, civil engineering, paleontology, geology, oceanography, fine arts, photography and tourism.
11) Experiencing interactive reality shows. This can be achieved by having a user direct the human assistant to perform actions in the human assistant's environment which are more or less staged for entertainment value thereby providing said user with an interactive reality show.

The video data directed to the telepresence workstation can be edited before being displayed by the workstation. This editing may take place either at the remote site, or at the user's workstation, or at a site on the internet included in the communication channel between the remote system and the user's workstation. This third alternative may be implemented in several ways. For example, data collected by the remote device could be first sent to a site on the internet to perform any necessary editing and additions. This site would then send this modified data to the user's workstation.

Editing the data may include adding written or graphical information designed to assist the user in his operation. This information may include maps of the remote environment, textual messages describing the state or nature of the object at the remote environment, general advertisements, or specific advertisement for objects on sale at the remote environment. In effect the display may provide the user with a complete merging of virtual and real data as well as providing the user with a GUI interactive environment.

In addition, the display could include navigation information such as position, orientation and altitude. It could also include weather data. It could also provide the user with touristic information and suggestions such as places to visit, shopping areas, restaurants and hotels as well as historical information about the area.

The display could also include textual information representing a transcription of the voice data detected at the remote site. Voice data would first be processed by a voice recognition system that would produce a text output. The text output could then be added to the display as "subtitles." This feature would particularly be interesting to hearing impaired users.

The same arrangement as above could also be used to translate voice information. Voice data would first be processed by a voice recognition system that would produce a text output. The text output would then be translated by a language translation system. The text output of the language translation system would then be sent to the user's workstation where it would be displayed as subtitles. Alternatively, the text output from the language translation system could be fed into a voice synthesis system generating an audio output that would be sent to the user's workstation and thereby conveyed to the user.

The workstation display could also be used to provide the user with running cost information for his renting or leasing of the telepresence system and labor cost for the human assistant.

Remote systems could also be in the form of video cell phones in which the screen is twistable to face away from the keyboard, thus allowing people at the remote environment to look at the face of the caller on the video cell phone held by the human assistant.

While the above description contains many specificities, the reader should not construe these as limitations on the scope of the invention, but merely as exemplifications of preferred embodiments thereof. Those skilled in the art will envision many other possible variations within its scope. Accordingly, the reader is requested to determine the scope of the invention by the appended claims and their legal equivalents, and not by the examples which have been given.

What is claimed is:

1. A telepresence system for providing telepresence service, said system comprising:
 a) a telepresence workstation located at a proximal site, allowing an end-user of said telepresence service, located at said proximal site, to define or specify a telepresence venue located at a remote site, said telepresence workstation comprising an interface for accepting control information from said user and also for conveying sensory information to said user;
 b) one or more remotely controlled mobile communication systems capable of video streaming located at one or more remote locations different from said proximal site, each said remotely controlled mobile communication system comprising at least one sensor for collecting sensory information from its environment, said sensory information including said video streaming, and furthermore each said remotely controlled mobile communication system requiring assistance from a human assistant located at said remote location to operate, said remotely controlled mobile communication systems comprising an interface for conveying a part or the whole of said control information to said human assistant, and furthermore said remotely controlled mobile communication system being carried openly by said human assistant;
 c) a marketplace conducted over a communication network for allocating from said multiplicity of remotely controlled mobile communication systems, to said specified telepresence venue, a particular remotely controlled mobile communication system henceforth dubbed allocated remote system;
 d) said marketplace also used for allocating from a pool comprising at least one person, at least one human assistant located at said remote site whose task is to assist said allocated remote system in its operation;
 e) a bi-directional communication channel linking said workstation to said allocated remote system, said communication channel transmitting said control information from said workstation to said allocated remote system, and also transmitting said sensory information back from said allocated remote system to said workstation for conveyance to said user.

f) wherein said user and said human assistant are defined as parties in a business relationship in which said user pays said human assistant for providing telepresence service to said user.

2. A telepresence system as in claim 1 wherein said telepresence workstation allows said user to specify said venue by presenting him with a list from which he can select said venue.

3. A telepresence system as in claim 1 wherein said telepresence user and telepresence workstation are selected from a multiplicity of networked communication devices and associated users.

4. A telepresence system as in claim 1 wherein said allocated remote system comprises an interface for conveying information from said human assistant back to said user.

5. A telepresence system as in claim 1 wherein said control information comprises audio data and said allocated remote system comprises a speaker for converting said audio data into sound.

6. A telepresence system as in claim 1 wherein said human assistant's tasks comprises at least one activity selected from the group consisting of:
   a) providing translational locomotory services for said remote control device;
   b) orientating said remote control device;
   c) providing engineering services for said remote control device;
   d) maintaining said remote control device;
   e) steering for said remote controlled device;
   f) operating sensor of said remote controlled device; and
   g) providing billing services for rental of said remote controlled device by said user.

7. A telepresence system as in claim 1 wherein said human assistant's tasks comprises at least one activity selected from the group consisting of:
   a) providing touristic guide services to said user;
   b) providing a language translation service to said user.

8. A telepresence system as in claim 1 wherein said telepresence workstation comprises a cell phone and said communication channel comprises a cellular network.

9. A telepresence system as in claim 1 wherein said telepresence workstation comprises a video cell phone and said communication channel comprises a cellular network capable of supporting video streaming.

10. A telepresence system as in claim 1 wherein said telepresence workstation comprises a camera that captures the image of said user, and packs information of said image into said control information, and wherein said allocated remote system comprises a display that utilizes part of, or all, said control information to display said image of said user.

11. A telepresence system as in claim 1 wherein said telepresence workstation comprises at least one data entry device selected from the group consisting of a keyboard, a mouse, a joystick, a lever, a touch pad, a light pen, a touch sensitive screen, a cursor ball, a scroll wheel, a sensory glove, an eye tracking device, a head tracking device, a pedal, an electroencephalogram machine, a skin conductivity sensor, and a microphone, for generating said control information.

12. A telepresence system as in claim 1 wherein said telepresence workstation comprises a display.

13. A telepresence system as in claim 1 wherein said telepresence workstation comprises a wheelchair.

14. A telepresence system as in claim 1 wherein said allocated remote system comprises a cell phone and said communication channel comprises a cellular network.

15. A telepresence system as in claim 1 wherein said allocated remote system comprises a video cell phone and said communication channel comprises a cellular network capable of supporting video streaming.

16. A telepresence system as in claim 1 wherein said control information comprises a code that can be executed by computing hardware, and wherein said allocated remote system comprises computing hardware, whereas said code is executed by the computing hardware at said allocated remote system.

17. A telepresence system as in claim 1 wherein said allocated remote system comprises a camera that collects from the environment information which it packs into said sensory information.

18. A telepresence system as in claim 17 wherein said camera is mounted on a motorized swivel that utilizes part of, or all, said control information to orient itself.

19. A telepresence system as in claim 1 wherein said allocated remote system comprises at least one audio or video means for converting part of, or all, said control information in a form suitable to be understood by humans.

20. A telepresence system as in claim 1 wherein said allocated remote system comprises at least one display.

21. A telepresence system as in claim 1 wherein said communication channel comprises at least one element selected from the group consisting of a cellular network, a radio link, a telephone link, a cable link, and the Internet.

22. A telepresence system as in claim 1 wherein said allocated remote system comprises mechanically disconnected parts, at least one of said parts is carried by said human assistant.

23. A telepresence system as in claim 1 wherein said allocated remote system comprises a mechanical transport means.

24. A telepresence system as in claim 23 wherein said mechanical transport means comprises wheels.

25. A telepresence system as in claim 23 wherein said mechanical transport means comprises mechanical legs.

26. A telepresence system as in claim 23 wherein said mechanical transport motion is controlled in part or in whole by said human assistant.

27. A telepresence system as in claim 1 wherein said allocated remote system is carried by a two-wheeled vehicle comprising a stabilization mechanism.

28. A telepresence system as in claim 1 wherein said remote controlled device comprises an artificial intelligence module, whereby it can achieve semi-autonomy from said user and said human assistant.

29. A telepresence system as in claim 1 wherein said sensory information is edited to convey to said user additional information.

30. A telepresence system as in claim 1 wherein said sensory information or said control information comprises voice data, and said telepresence system comprises an automated voice recognition means for converting said voice data to a written transcription.

31. A telepresence system as in claim 1 wherein said sensory information or said control information comprises voice or textual data expressed in a first language and said telepresence system also comprises a language translation means for translating said data expressed in said first language, into data expressed in a second language.

32. A telepresence system as in claim 1 wherein said human assistant carries a display of said user.

33. A telepresence system as in claim 32 wherein said display is equipped with two cameras on either side, each of said cameras generating an independent video stream, said video streams being processed by a means for producing a virtual perspective located between said cameras.

34. A telepresence system as in claim 31 wherein said human assistant wears a mask, hood, or burkha as a means for shielding his own face and emphasizing the virtual presence of said user at said remote location.

35. A telepresence system as in claim 1 wherein said user is a prospective student and said remote location is a university.

36. A telepresence system as in claim 1 wherein said user is a prospective real estate buyer and said remote location is a real estate for sale.

37. A telepresence system as in claim 1 wherein said user is a conference tele-attendee and said remote location is a conference.

38. A telepresence system as in claim 1 wherein said user is a tourist and said remote location is a tourist area.

39. A telepresence system as in claim 1 wherein said remote area is a nursing home or a hospital.

40. A telepresence system as in claim 1 wherein said user is a shopper and said remote area is a shopping area.

41. A telepresence system as in claim 1 wherein said user directs in part or in whole said human assistant to perform actions in said human assistant's environment which has been staged for entertainment value thereby providing said user with an interactive reality show.

42. A telepresence workstation as in claim 1 wherein said telepresence operation takes place at a prearranged time and prearranged said remote location.

43. A business transaction method for providing telepresence service over a communication network to an end-user of said telepresence service, said user located at a proximal site, said telepresence service comprising the operation by the user through a telepresence workstation located at said proximal site, of a mobile communication remote controlled system capable of video streaming and located at a remote site, said remotely controlled mobile communication system henceforth dubbed remote controlled system, said operation requiring the help of a human assistant also located at said remote site, said remote site being different from said proximal site, said business transaction comprising:
  a) performing the intake of said user, said intake comprising conveying to said user pricing information regarding said telepresence service and furthermore comprising allowing said user to define or select a venue for said telepresence service, said venue being located at a remote site and said venue defining a time for said telepresence service;
  b) allocating to said user said remote controlled system partly or wholly according to said selected venue, said allocated remote controlled system located at said remote site and requiring human assistance at said remote site for its operation;
  c) allocating to said user at least one human assistant available at said remote site partly or wholly according to said venue, to assist said allocated remote controlled system;
  d) obtaining the authorization of said user for said allocated remote controlled system and said allocated human assistant;
  e) upon receiving said authorization, reserving said allocated remote system and reserving said human assistant;
  f) at said time of telepresence service, establishing a bi-directional communication link between said telepresence workstation and said allocated remote system;
  g) providing said telepresence service, said telepresence service comprising control information flowing from said proximal site to said remote site and also comprising sensory information flowing from said remote site to said proximal site, said sensory information including said video streaming;
  h) obtaining a measure of usage of said remote system by said user, said measure being defined as a predetermined function of usage;
  i) billing said user according to said measure of usage; and
  j) said business transaction being conducted openly.

44. A business transaction method as in claim 43 wherein said venue is selected from a list.

45. A business transaction method for providing telepresence service over a communication network to a user located at a proximal site, said telepresence service comprising the operation by said user through a telepresence workstation located at said proximal site, of a mobile communication system capable of video streaming located at a remote site, said operation requiring the help of a human assistant also located at said remote site, said communication network being connected to an auction market service, said telepresence service also comprising the transmission of sensory information from said remote site to said proximal site and furthermore comprising the transmission of control information from said proximal site to said remote site, said sensory information including said video streaming, said remote site being different from said proximal site, said business transaction comprising:
  a) said user accessing said auction market service and performing a user-defined action, said user defined action comprising:
    i. participating in said auction market to purchase said telepresence service;
    ii. sending said control information over said communication network, and
    iii. receiving said sensory information over said communication network; and
  b) said human assistant accessing said auction market and performing a human-assistant-defined action said human assistant-defined action comprising:
    i. participating in said auction market to sell said telepresence service;
    ii. sending said sensory information over said communication network; and
    iii. acting upon said control information.

46. A business transaction as in claim 45 wherein said human assistant-defined action comprises posting of a price offer for services to be rendered by said human assistant and said user-defined action comprises accepting said price offer.

47. A business transaction as in claim 45 wherein said human assistant-defined action comprises posting of a minimum bid for services to be rendered by said human assistant and said user-defined action comprises bidding for said services.

48. A business transaction as in claim 45 wherein said remote mobile communication system is rented or leased by a business owner, to said human assistant or to said user.

49. A business transaction as in claim 45 wherein said user-defined action comprises posting of a bid offer for services to be rendered by said human assistant and said human assistant-defined action comprises accepting said bid to provide said services to said user.

* * * * *